United States Patent [19]
Wheeler

[11] 3,728,058
[45] Apr. 17, 1973

[54] PLASTIC MELT TEMPERATURE CONTROL

[75] Inventor: James E. Wheeler, Roanoke, Va.

[73] Assignee: General Electric Company, Salem, Va.

[22] Filed: Nov. 1, 1971

[21] Appl. No.: 194,233

[52] U.S. Cl. .................. 425/144, 425/135, 425/149
[51] Int. Cl. ............................................... B29c 3/02
[58] Field of Search ..................... 425/143, 144, 242, 425/245, 135, 149

[56] References Cited

UNITED STATES PATENTS

| | | | |
|---|---|---|---|
| 3,454,221 | 7/1969 | Emich | 425/143 X |
| 3,628,901 | 12/1971 | Paulson | 425/149 |
| 3,642,402 | 2/1972 | Hutchinson et al. | 425/144 |

Primary Examiner—H. A. Kilby, Jr.
Attorney—Arnold E. Renner et al.

[57] ABSTRACT

A plastic melt temperature control for use with a plastic injection molding machine having a heated barrel, a reciprocating and rotating screw within the barrel and a hydraulic or similar system for applying pressure to the back of the screw, and electrical controls for the barrel heaters, the screw speed and the pressure system provides for the automatic adjustment of the temperature of the plastic. A pulse generator selectively applies pulses to three independent reversing counters, one counter for each of the functions controlled. The contents of each counter is proportional to the quantity of power derived from a power source to control each of the functions. Logic circuitry provides selective choice of counters the contents of which are to be increased or decreased in order to change the temperature of the plastic melt when required.

11 Claims, 9 Drawing Figures

United States Patent [19]
Wheeler

OPERATION FINISHED

FIG.5

PLASTIC MELT TEMPERATURE CONTROL

BACKGROUND OF THE INVENTION

In plastic injection molding machines, molten plastic, normally referred to as the "melt", is injected into a mold to form the finished product. The viscosity of the melt, which for a given material is due largely to the temperature of the melt, is to a great extent responsible for the physical properties of the molded part. Thus, accurate control of the temperature of the melt will improve the quality of the final product.

Generally, there are three methods, used in combination, for controlling the temperature of the melt. These are: (1) the control of the amount of electrical power supplied to heater elements of the barrel of the molding machine; (2) the control of rotational speed of a feed screw located within the barrel; and, (3) the control of the amount of pressure applied to the screw. In most plastic injection molding machines, the plastic material is initially in the form of pellets which are placed in a hopper at one end of a heated barrel. A rotating screw transports the pellets toward the other end of the barrel which is provided with a valved nozzle. The screw is designed such that the flutes of the screw cause the pellets to be sheared and compressed. The friction due to the shearing and compression serves as the main source of heat for effecting the melt. In addition to rotational motion, the screw is mounted within the barrel for reciprocating motion. As the melt moves toward the nozzle end of the barrel, pressure is built up in front of the screw which tends to force the screw away from the nozzle thereby providing a melt chamber between the front of the screw and the nozzle. A hydraulic system, or the like, provides a force behind the screw in opposition to the melt pressure in order to maintain the melt under pressure. Cyclically, the screw is stopped, the nozzle valve opened and the hydraulic system actuated to force the screw forward and thereby inject the melt into a mold positioned beyond the nozzle. The temperature of the melt may be controlled by changing the rotational speed of the screw, the amount of pressure maintained on the screw, or the barrel temperature. Since the plastic materials tend to be poor conductors of heat, barrel temperature is generally used only to provide adiabatic conditions, whereby the temperature gradient throughout the melt is maintained constant. The actual changing of the temperature of the melt is more efficiently performed by changing the screw speed, the screw pressure, or a combination of both.

In the past, the adjustments of speed, pressure and barrel temperature have been dependent on the skill of the operator. Since these are independent variables, a great deal of skill and knowledge is required to produce a satisfactory product.

BRIEF SUMMARY

In order to overcome the inaccuracies resulting from manual adjustment of controls, the present invention provides means for selectively varying each of the functions, screw speed, pressure and barrel temperature. Included are control means for varying the quantity of power applicable to each function, a regulator whereby the quantity of power applied to each function control is regulated and logic circuitry for selecting the function to be regulated in response to the combination of conditions prevailing with respect to each of the variables at the time a change in temperature of the plastic melt is required.

BRIEF DESCRIPTION OF THE DRAWINGS

For a better understanding of the invention as defined by the claims appended to and forming a part of this description, reference is made to the accompanying drawings in which:

DETAILED DESCRIPTION

Figure 1:
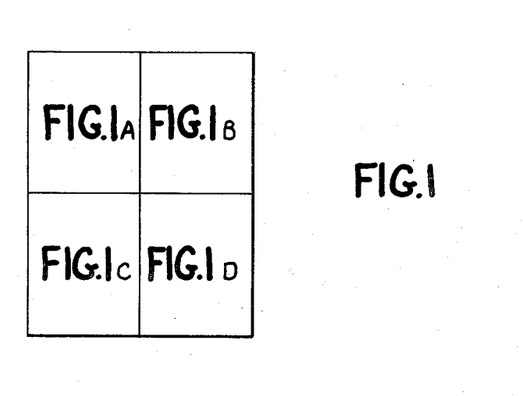
FIG. 1 shows the inter-relationship of FIG. 1A–1D.
Figure 1A:
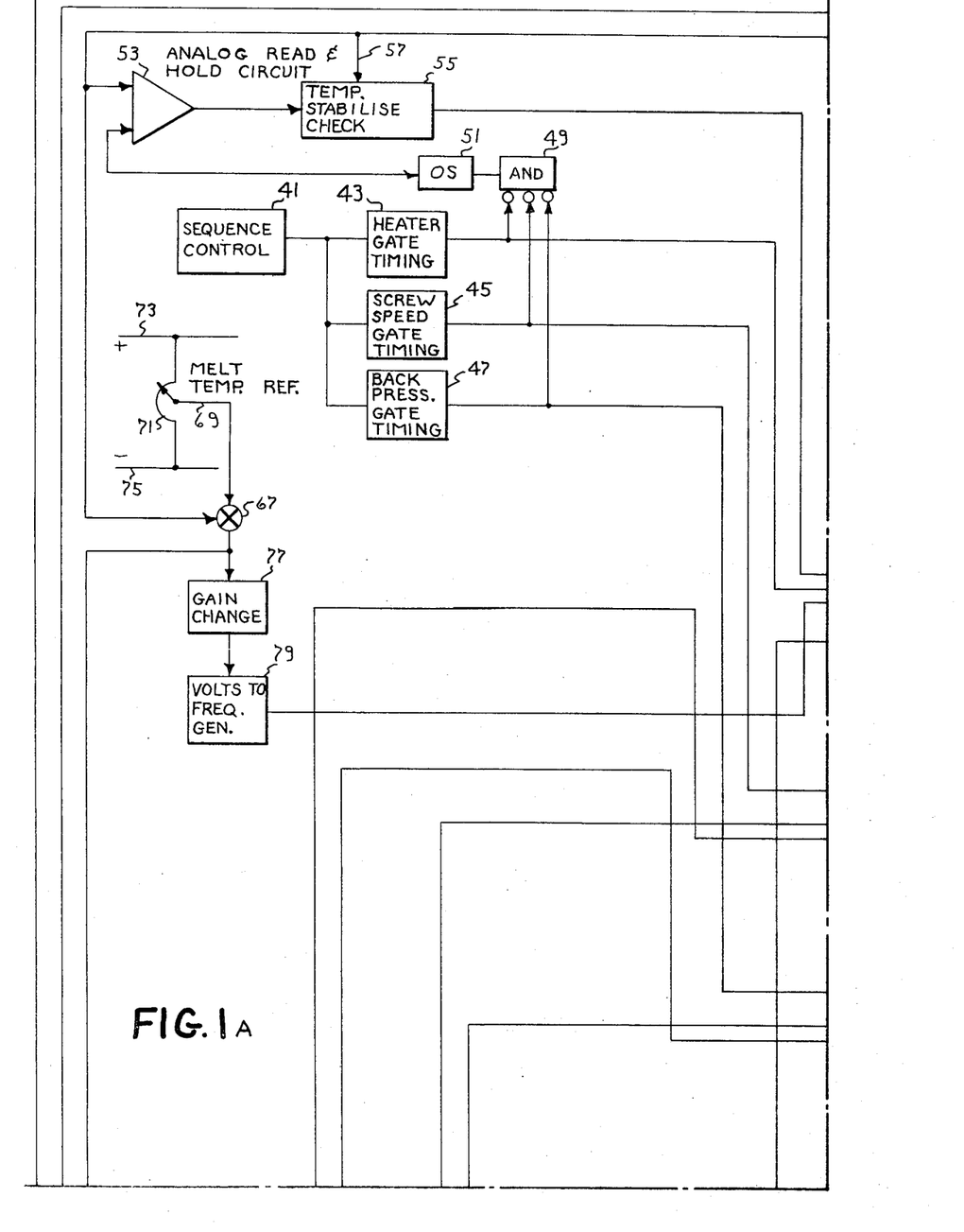
FIGS. 1A–1D illustrate the preferred embodiment of the present invention.
Figure 1B:
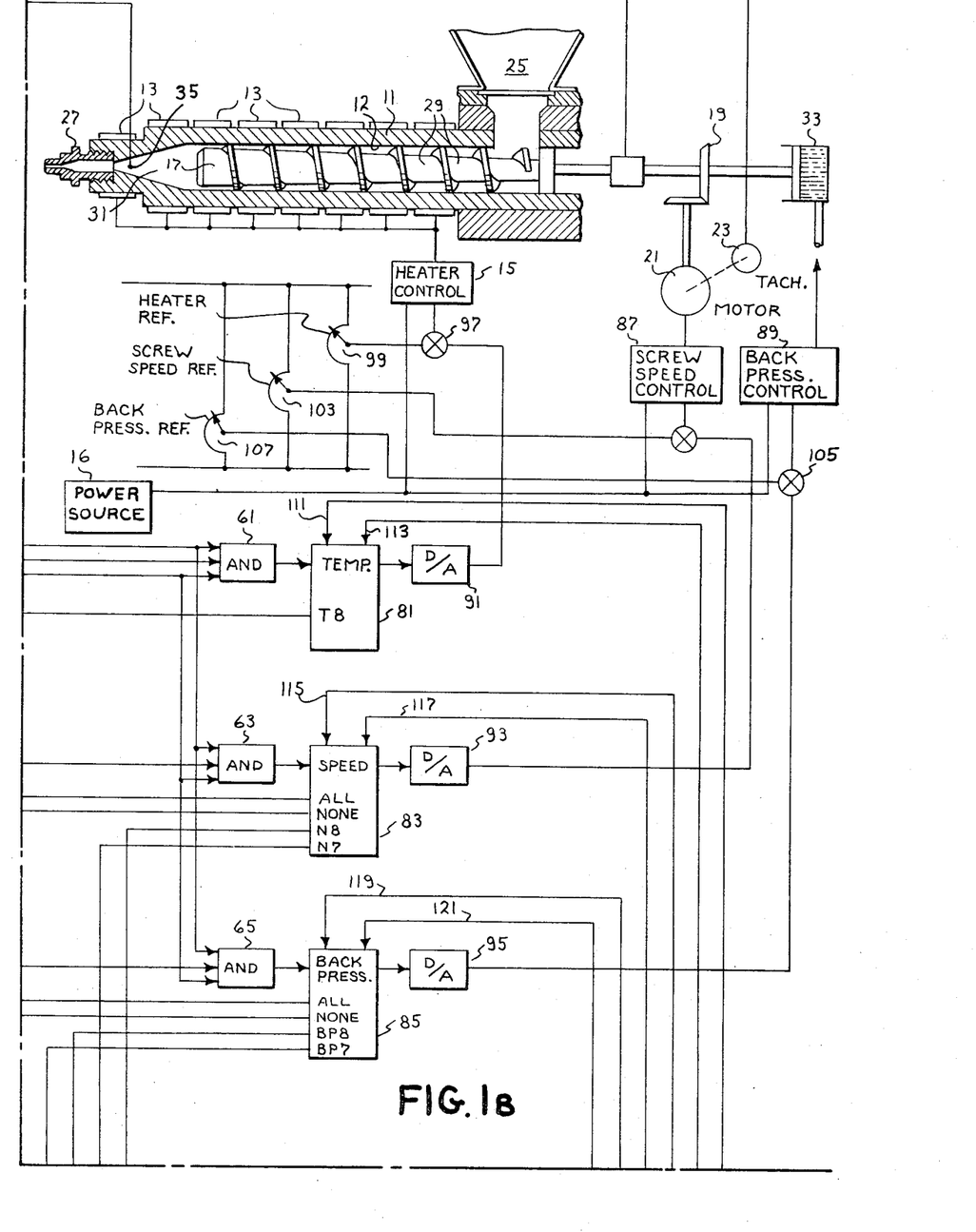

Referring first to FIG. 1B, an injection molding machine barrel 11, having a centrally extending bore 12, is surrounded by a series of heating elements 13 which are energized by a heater control 15 powered from a power source 16. A screw 17, disposed within the bore 12, is adapted to be rotated by suitable means such as the illustrated motor 21 acting through a gearing arrangement 19. Other means such as a variable flow fluid motor could, of course, be used. Attached to the motor 21 is a tachometer 23 which provides a suitable signal proportional to motor and hence screw speed. In the present embodiment this signal is an analog voltage signal. A hopper 25, located at the back end of the barrel 11 is provided for introducing plastic material (usually in the form of pellets) into the barrel. The plastic material is conveyed toward a nozzle 27 at the front end of the barrel, there to be injected into a mold (not shown) by the screw 17. The machine design generally provides three zones within the barrel. The three zones are defined as: (1) the feed zone located directly beneath the hopper 25; (2) the compression zone located along the major length of the screw; and, (3) the metering zone which is located toward the nozzle end in front of the screw 17. As the screw rotates, the plastic pellets are conveyed from the feed zone to the compression zone. As is illustrated in the drawing, the depth of the screw flute 29 is gradually decreased along the screw length such that the plastic material is subjected to shearing and compression actions between the inner surface of barrel 11 and the flute 29 of screw 17. The heat thus developed is absorbed by the plastic material itself, causing it to melt.

From the compression zone, the now melted plastic is pumped by the screw to the metering zone 31 (after referred to as the "shot chamber") at the front end of the barrel 11. Heating elements 13 located along the barrel length are primarily for the purpose of preventing heat from dissipating from the melt thus providing an adiabatic condition. From the metering zone the melt passes through a backflow valve (not shown) associated with the nozzle 27 at the front end of the barrel 11. As the chamber 31 in front of the screw fills with the melt, pressure is built up which forces the rotating screw backward to a predetermined position. When this position is reached, a limit switch (not shown) operates to stop the rotation of the screw 17. The accumulated plastic is now ready to be injected into a mold by causing the screw to move in a piston action toward the nozzle by suitable means such as a piston 33 action at the rear end of the screw.

Different variations of the above-described arrangement are used throughout the industry; however, in all variations, the three functions — rotation of the screw, pressure on the screw, and heating of the barrel — in various quantities provide the conditions required to produce a suitable melt temperature. The proper combination of barrel heat profile, pressure and screw speed must be achieved for each mold and each type of plastic material.

Referring now to FIGS. 1A–1D collectively, a sequence control 41 (FIG. 1A) generally oversees the entire process of the injection molding machine. In the present invention, in addition to its usual control responsibilities such as the clamping of the mold, injecting the plastic into the mold and the other processes normally encountered in the injection molding machine, the sequence control 41 also provides a timing signal to a heater gate timing circuit 43, a screw speed gate timing circuit 45, and a back pressure gate timing circuit 47. These three timing circuits each provide a pulse of a duration adjustable to suit the conditions described later. The output signals of the gate timing circuits 43, 45 and 47 are of binary nature; that is, a binary ONE value is obtained when the signal reaches a predetermined voltage and a binary ZERO value when no voltage or a minimal voltage exists. The outputs from each of the three gate timing circuits 43, 45 and 47 are applied to an AND circuit 49 having inverting input circuitry represented by the three small circles as part of the symbol. (This inverting circuitry operates such that when a binary ONE signal is applied as an input, the binary ZERO is produced as an output.) Thus, only when all three input signals to the AND circuit 49 are binary ZERO, is a binary ONE signal produced from its output which signal is applied to a monostable multivibrator or one shot 51. The result of the binary ONE signal application to the one shot 51 is a pulse of predetermined length which is applied to the input of an analog read and hold circuit 53.

A temperature responsive transducer such as a thermocouple 35, positioned within the chamber 31 of barrel 11, produces the voltage signal which is proportional to the temperature of the plastic melt. This thermocouple output is applied as a second input of the analog read and hold circuit 53 and as an input to a temperature stabilize check circuit 55. The analog read and hold circuit 53 is designed to store the signal from the thermocouple 35 representing the melt temperature at that time for a predetermined period of time. When the pulse from the one shot 51 is applied to the input of the analog read and hold circuit 53, the stored signal is applied to the temperature stabilize check circuit 55. The temperature stabilize check circuit also receives a signal from the thermocouple through input 57 representing the instantaneous temperature of the melt which is compared with the stored signal representing the temperature of a preceding reading. If the difference between the temperature of the preceding reading (stored) and the instantaneous temperature is less than a predetermined amount, the temperature stabilize check circuit produces a binary ONE signal. If, however, the difference between the two readings is greater than the predetermined amount, a binary ZERO signal is produced by the temperature stabilize check circuit 55.

There are two phases of the temperature control of the present system. In the first phase, automatic adjustment of the melt temperature is prevented until there has been temperature stabilization while in the second phase the melt temperature is adjusted to that desired. Considering now the first phase, if an existing command to increase temperature has not been fully met (temperature not stabilized) the signal from the check circuit 55 will be a binary ZERO as previously described. This ZERO signal is simultaneously applied to each of three AND circuits 61, 63 and 65 thus disabling these three circuits. With these three circuits disabled, additional commands to effect a temperature variation are inhibited.

Assume now that the temperature has stabilized so that the second phase of control is applicable. The temperature stabilize check circuit 55 now produces a binary ONE signal, which is applied to the temperature AND circuit 61, the screw speed AND circuit 63 and the back pressure AND circuit 65. In addition to supplying a temperature proportional signal to the analog read and hold circuit 53 and the temperature stabilize check circuit 55, the thermocouple 35 also applies the signal to a summing junction 67. A melt temperature reference circuit 69 represented by a potentiometer 71 connected between a positive bus 73 and a negative bus 75, applies an additional analog signal proportional to desired melt temperature to the summing junction 67. In this summing junction, the temperature signal from thermocouple 35 is algebraically added to the melt temperature reference signal from potentiometer 71 and the resultant signal is applied to a gain change circuit 77. The output from the gain change circuit is applied to a voltage to frequency generator 79 which produces a pulse train having a frequency proportional to the voltage applied to its input. The gain change circuit 77 adjusts the signal applied to the frequency generator in two steps as a function of the magnitude of the voltage applied to its input. In other words, with a small difference (less than a predetermined amount) in temperature between the temperature signal from the thermocouple 35 and the reference circuit 69 output, the gain change circuit supplies a small voltage signal to the voltage to frequency generator 79. However, with a difference greater than the predetermined amount, the gain change circuit 77 produces a larger voltage signal to the frequency generator 79 thereby causing the frequency generator to produce a much higher frequency of pulses.

The output pulses from the voltage to frequency generator 79 are continuously applied as inputs of the AND circuits 61, 63 and 65. A third input to each of the AND circuits 61, 63 and 65 is derived, respectively, from the heater gate timing circuit 43, the screw speed gate timing circuit 45 and the back pressure timing gate 47. When three binary ONE signals are applied to the three inputs of any of the AND circuits 61, 63 and 65, the circuit is enabled and will gate the pulses derived from the voltage to frequency generator 79 as inputs respectively to a temperature counter 81, a screw speed counter 83 and a back pressure counter 85. The contents of each of the counters are applied to respective digital to analog circuits 91, 93 and 95, which convert the digital contents of the respective counters to a voltage signal used to update the respective controls, such as a heater control 15, a screw speed control 87, or a back pressure control 89.

The voltage signal derived from the digital to analog circuit 91 is applied to a summing junction 97 which algebraically sums that voltage signal to a voltage signal, representing a heater temperature reference value derived from a potentiometer 99. The resultant sum of the two signals from the junction 97 is applied to the heater temperature control 15. Similarly, the output of the digital to analog circuit 93, representing the contents of the screw speed counter, is applied to a summing junction 101 where this output is summed algebraically to a screw speed reference signal derived from a potentiometer 103. The resultant signal from junction 101 is applied to the screw speed control 87. The output of the digital to analog circuit 95 is applied to a summing junction 105 where this signal is algebraically summed with a back pressure reference signal derived from a potentiometer 107. The resultant sum of these two signals is applied to the back pressure control circuit 89.

The updating of the counters 81, 83 and 85 occurs as follows. These counters are of the count up/count down type; in other words, the contents may be added to, or subtracted from depending on a pair of steering signals. In the temperature counter 81, a binary ONE signal applied on line 111 will cause the contents to be reduced by a series of input pulses derived from the temperature AND circuit 61. The temperature counter 81 will have its contents increased when a binary ONE signal is applied by input line 113. Similarly, the screw speed counter 83 will count down (reduce its contents) when a binary ONE signal is applied to input 115 and will count up (increase its contents) when a binary ONE signal is applied to input 117. The content of the back pressure counter 85 is lowered when a binary ONE signal is applied to input 119 and raised when a binary ONE signal is applied to input 121. Of these six input or steering signals, only one signal will be actuated at any one time, so that only one of the counters will have its contents changed. This function is performed by logic circuitry shown in FIGS. 1C and 1D.

Figure 1C:
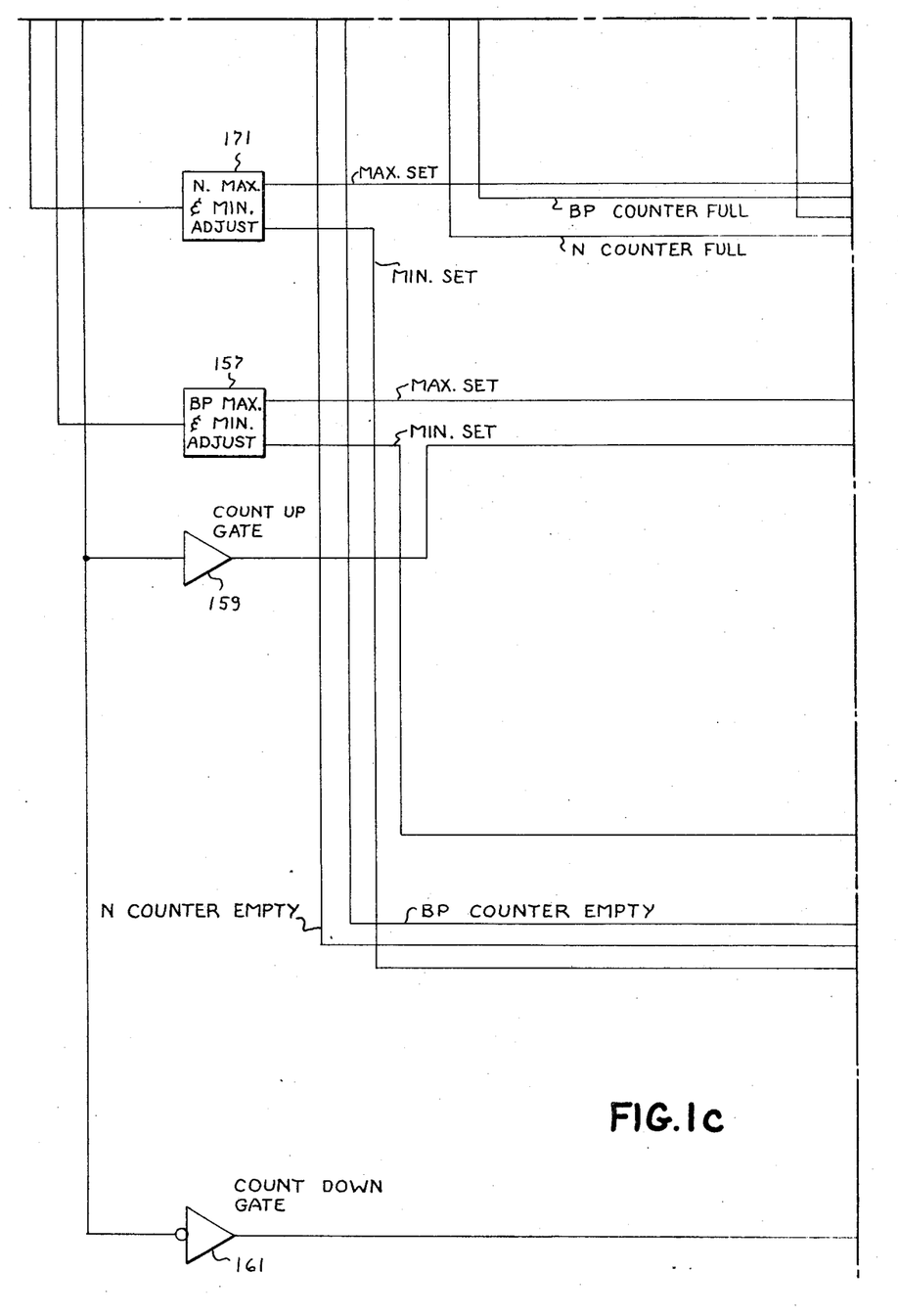
Figure 1D:
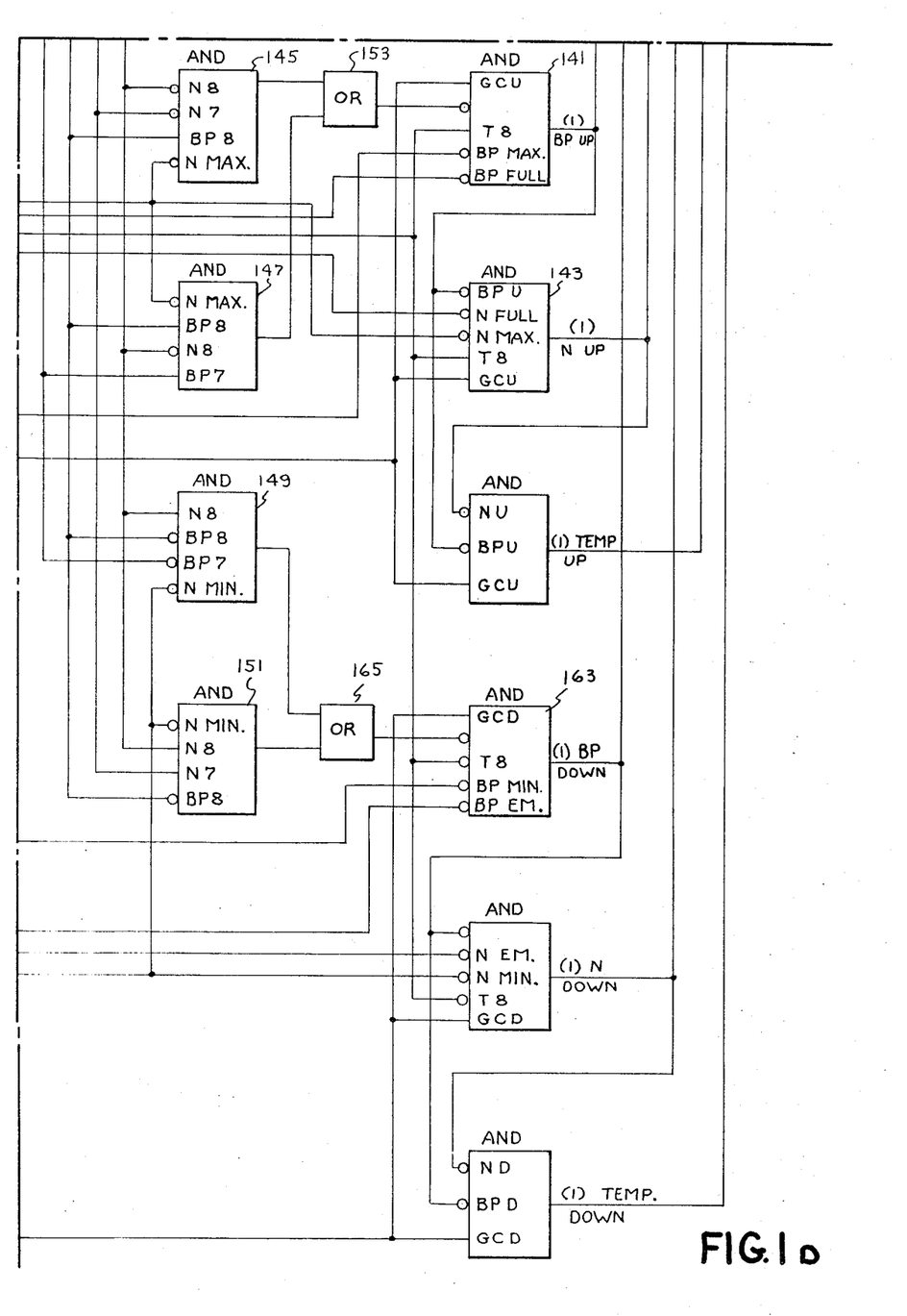
Figure 2:
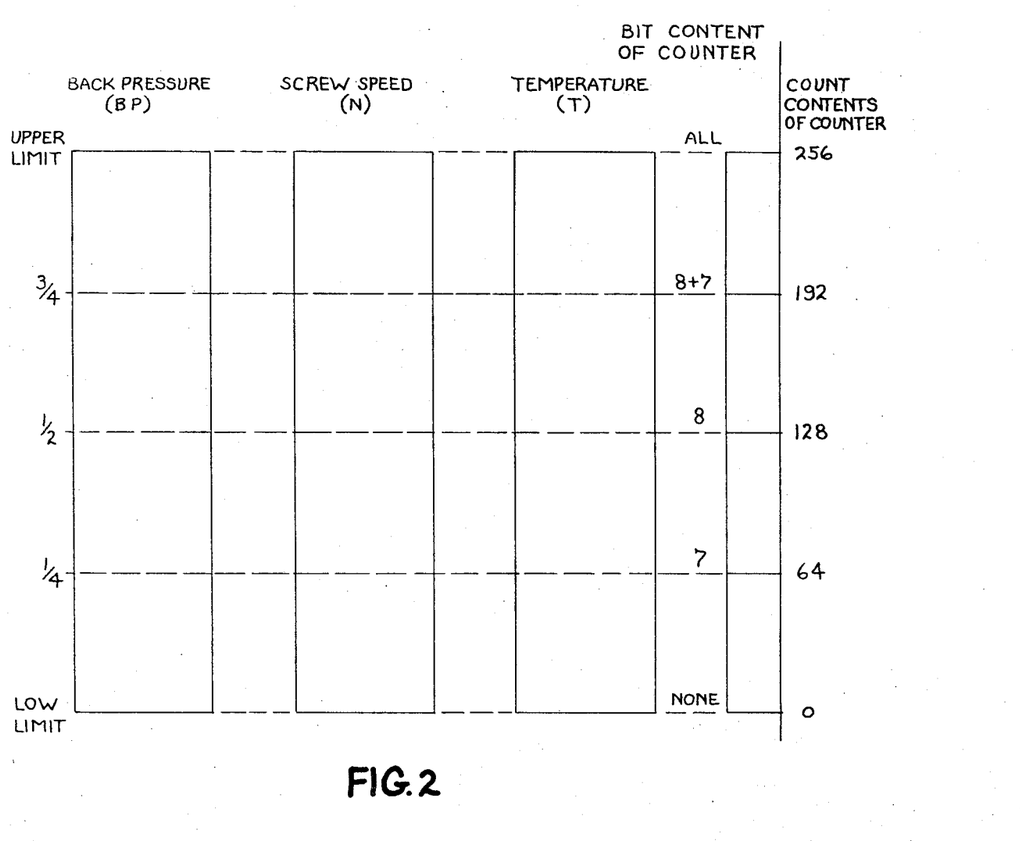
FIG. 2 is a diagramatic representation of the counters with emphasis on contents thereof.

Before describing the circuitry of FIGS. 1C and 1D, however, reference is made to FIG. 2 showing a graphic representation of each of the counters 85, 83 and 81 with respect to the contents thereof. In the embodiment of the invention presently being described, each of the counters 81, 83 and 85 is an eight bit counter and is, therefore, capable of a total count of 256. Specifically referencing now FIG. 2, the lower most line represents a count of ZERO in which all bits of the counter will be in the reset condition. The first line from the bottom represents one quarter of the total possible count or a count of 64 at which time only bit 7 of the counter will be in the set condition. At the one half point (count 128) only bit 8 will be set and at the three quarters point (count 192) bits 7 and 8 will be set. When the counter is full, a count of 256, all eight bits of the counter will be in the set condition.

In the present invention, priorities are established in the selection of the function controlling the injection molding machine. The first priority to correct melt temperature is assigned to the back pressure control. Secondly, screw speed is used for making additional correction and lastly temperature of the heating element is used to aid in the correction of the melt temperature. The selection of the control function is dependent on existing conditions as reflected in the contents of the counters. Under normal operating conditions the counters 81, 83 and 85 are approximately half full; in other words, the count is approximately 128. The eighth bit is therefore set.

If an increase in temperature is required, as indicated by a difference between the output of thermocouple 35 (FIG. 1B) and the output of the reference circuit 69 (FIG. 1A) pulses from the voltage to frequency generator 79 are applied to the AND circuits 61, 63 and 65. Assuming that the temperature has stabilized a binary ONE signal from the temperature stabilize check circuit 55 is also applied to the AND circuits 61, 63 and 65. In addition to these two signals, the gate timing circuits 43, 45 and 47 also produce binary ONE signals to each of the AND circuits 61, 63 and 65. The pulses from the frequency generator are thereby allowed to be applied to each of the counters 81, 83 and 85. The counters, however, will not accumulate these pulses until a steering signal is applied to one of them. With conditions normal, the counters are approximately half full so that the eighth bit of each of the counters is set. As a result of these conditions, the temperature counter 81 provides a binary ONE signal from a terminal T8 which is applied to AND circuits 141 and 143 (FIG. 1D). The screw speed counter 83 also produces a binary ONE signal from terminal N8, since its eighth bit is enabled or set, which is applied to AND circuits 145, 147, 149 and 151. The back pressure counter 85 also produces a binary ONE signal from a terminal BP8, since its eighth bit is set, which is applied to AND circuits 145, 147, 149 and 151. With the screw speed counter 83, one half full, the seventh bit is reset producing a binary ZERO from its terminal N7. This ZERO signal is applied to AND circuits 145 and 153. An AND circuit, as described previously, produces a binary ZERO signal when one of its inputs is a binary ZERO. However, if all input signals to the AND circuit are binary ONE signals, the AND circuit produces a binary ONE signal from its output. The small circle shown at some of the inputs of the AND circuits is an inversion symbol indicating that a binary ONE signal is inverted and becomes a binary ZERO when applied to the AND circuit. Thus, in the present instance, AND circuit 145 has applied thereto a binary ONE at the N8 terminal which is inverted, resulting in a binary ZERO input signal. With a binary ZERO signal applied to one of its inputs, AND circuit 145 produces a binary ZERO output signal. The AND circuit 147 has a binary ZERO signal at the N8 terminal resulting from the inversion of a binary ONE signal from counter 83 resulting in a binary ZERO output signal which is applied to an OR circuit 153.

OR circuits, such as OR circuit 153, produce binary ONE signals when a binary ONE signal is applied to either of its input terminals. If both input signals are binary ZERO, the output is binary ZERO. Hence, since two binary ZERO signals are applied to OR circuit 153, the resultant output signal is a binary ZERO which is applied to the AND circuit 141 and inverted by the inversion circuit, resulting in a binary ONE signal input.

The AND circuit 141 has applied thereto three more input signals, GCU, BP/max, and BP/full. The BP/full signal is derived from the back pressure counter 85 and indicates that this counter is full. However, as stated previously, the counters are at the half-full mark so that not all the bits of counter 85 will produce a binary ONE signal, resulting in a binary ZERO output from the "ALL" output of counter 85. This ZERO signal is inverted to a binary ONE signal applied to the BP/full input of AND circuit 141. The BP/max signal applied to the AND circuit 141 is derived from a BP/max-min adjust circuit 157 which provides means for an operator to set the maximum and the minimum limits of back pressure allowable for the screw of the injection molding machine. Since normal conditions prevail maximum set back pressure has not been reached. Thus, the BP/max and min adjustment circuit 157 produces a binary ZERO on the max set output, which is applied to the BP/max input terminal of AND circuit 141 and upon inversion becomes a binary ONE signal. A previous assumption was that the temperature of the plastic melt needs to be raised so that the summing junction 67 assumes a positive voltage level which is applied to the input of the countup gate 159, the output of which is a binary ONE signal. This binary ONE signal is applied to the GCU terminal of the AND circuit 141. The AND circuit 141 now has applied thereto five binary ONE signals which cause this circuit to produce a binary ONE output signal which is applied to the back pressure counter 85 at terminal 121. A binary ONE signal applied to this terminal directs the back pressure counter to count up and accumulate additional counts for a duration of the time established by the back pressure gate timing circuit 47. The additional counts now accumulated in the counter 85 are converted to a voltage signal in the digital to analog circuit 95 which applies this voltage signal to a summing junction 105. The summing junction algebraically adds this voltage signal to the output of the back pressure reference potentiometer 107. The resultant new signal is applied to the back pressure control 89 whereby cylinder 33 is caused to increase the pressure on the screw 17.

Assume now that the melt temperature needs to be reduced. The signal this time produced by the melt temperature reference summing junction 67 will be negative in polarity and is applied to the countdown gate 161. The countdown gate 161 contains an inverting circuit causing a positive voltage, the equivalent of a binary ONE signal. This binary ONE signal is applied to the GCD terminal of AND circuit 163. OR circuit 165 receives a binary ZERO signal from each of AND circuits 149 and 151 and, hence, produces a binary ZERO output signal. This binary ZERO signal is inverted and applied to the AND circuit 163 as a binary ONE signal. For the purpose of the explanation of the circuitry logic, assume that the count in the temperature counter is slightly less than half; that is, less than 128. This condition causes the temperature counter to provide a binary ZERO at its T8 terminal This binary ZERO signal is then inverted and becomes a binary ONE signal when applied to AND circuit 163. Assume also that the minimum value as set by the BP/max and min adjustment circuit 157 has not been reached so that a binary ZERO signal is produced there. This binary ZERO signal is also inverted, causing a binary ONE signal to be introduced at BP/min terminal of AND circuit 163. Since the back pressure is approximately halfway, the back pressure counter 85 cannot be empty, so that a binary ZERO from counter 85 is applied to AND circuit 167. This AND circuit 167 therefore produces a binary ZERO which is applied to the BP/EM terminal of AND circuit 163. With all inputs to the AND circuit 163 being binary ONE signals, this AND circuit produces a binary ONE output signal which is applied to downcount terminal 119 of the back pressure counter 85. Pulses derived from the voltage to frequency generator 79 and applied to the AND circuit 65 will now cause the back pressure counter 85 to count down for a period of time, the duration of which is determined by the back pressure gate timing circuit 47 (FIG. 1A). With the contents of the back pressure counter 85 reduced, the digital to analog circuit 95 will produce a proportionally lower voltage output signal. This voltage signal is algebraically added to the voltage signal produced by the back pressure reference potentiometer 107 in summing junction 105. The resultant signal is applied to the back pressure control 89 causing the pressure on cylinder 33 to be reduced proportionally.

The examples described above are two possibilities resulting from many combinations of logic signals, which determine the mode of control and the priorities involved in the selection thereof.

The melt temperature correction is implemented by the variable selected by the following decision logic. Primarily, back pressure change is used to make melt temperature correction. Screw speed change becomes the secondary correcting variable if the back pressure cannot, within predetermined limits, achieve the desired temperature. Barrel temperature change is used under extreme conditions only. These decisions are based on the following reasoning: (1) Barrel temperature should be held at a value such that heat flow to and from the plasticized melt is zero. Heat flow to and from the barrel through the cross-section of the melt will cause an undesirable temperature gradient across the cross-section due to low thermal conductivity of the melt. For the same reason, heat transferred to the melt from the barrel is insufficient and temperature change is a slow mechanism for changing melt temperature compared to back pressure and speed of the screw. (2) Back pressure will establish a desired compactness as plastic pellets are plasticized when sheared and compressed by the tapered screw flights, thus forcing the screw back against the opposing back pressure as the melt builds up in the chamber in front of the screw. (3) Conversion of mechanical energy to heat energy in order to plasticize the pellets by shearing and compressing with a screw offers an efficient method of obtaining a homogeneous plasticized melt. The following refinements are offered by the present invention.

1. High and low limits are implemented on the back pressure to turn the control of the melt temperature over to screw speed if these limits are reached. If the high limit is reached, further increase of back pressure is inhibited but back pressure may be reduced to decrease melt temperature. If the low limit is reached, further decrease of back pressure is inhibited but back pressure may be raised to increase melt temperature.

2. High and low limits are implemented on screw speed to turn the control of the temperature over to barrel temperature if these limits are reached. If the high limit is reached, further increase of screw speed is inhibited but screw speed may be lowered to decrease melt temperature. The operation of the junction molding machine is cyclically controlled by the sequence control.

Figure 3:
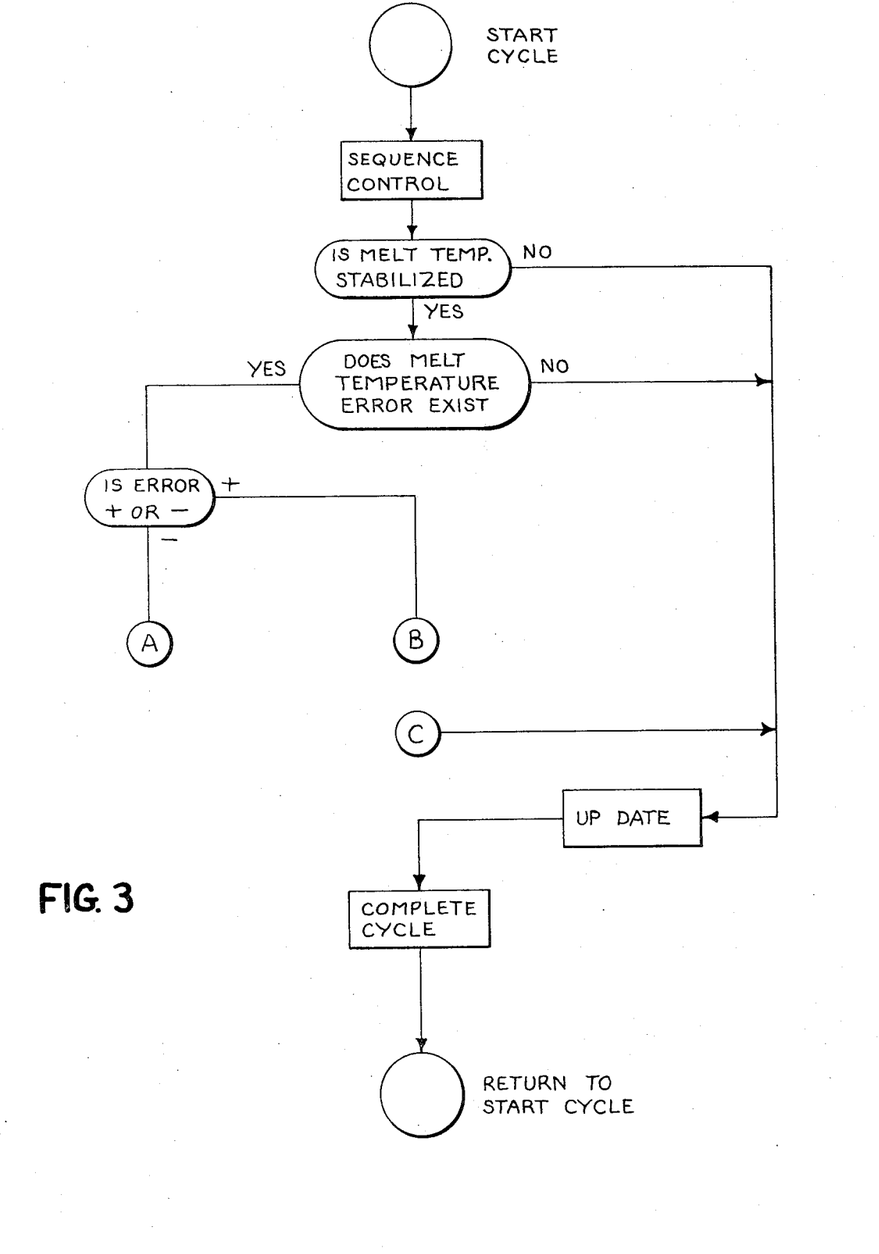
FIGS. 3–5 are flow charts for determining priority of control functions.
Figure 4:
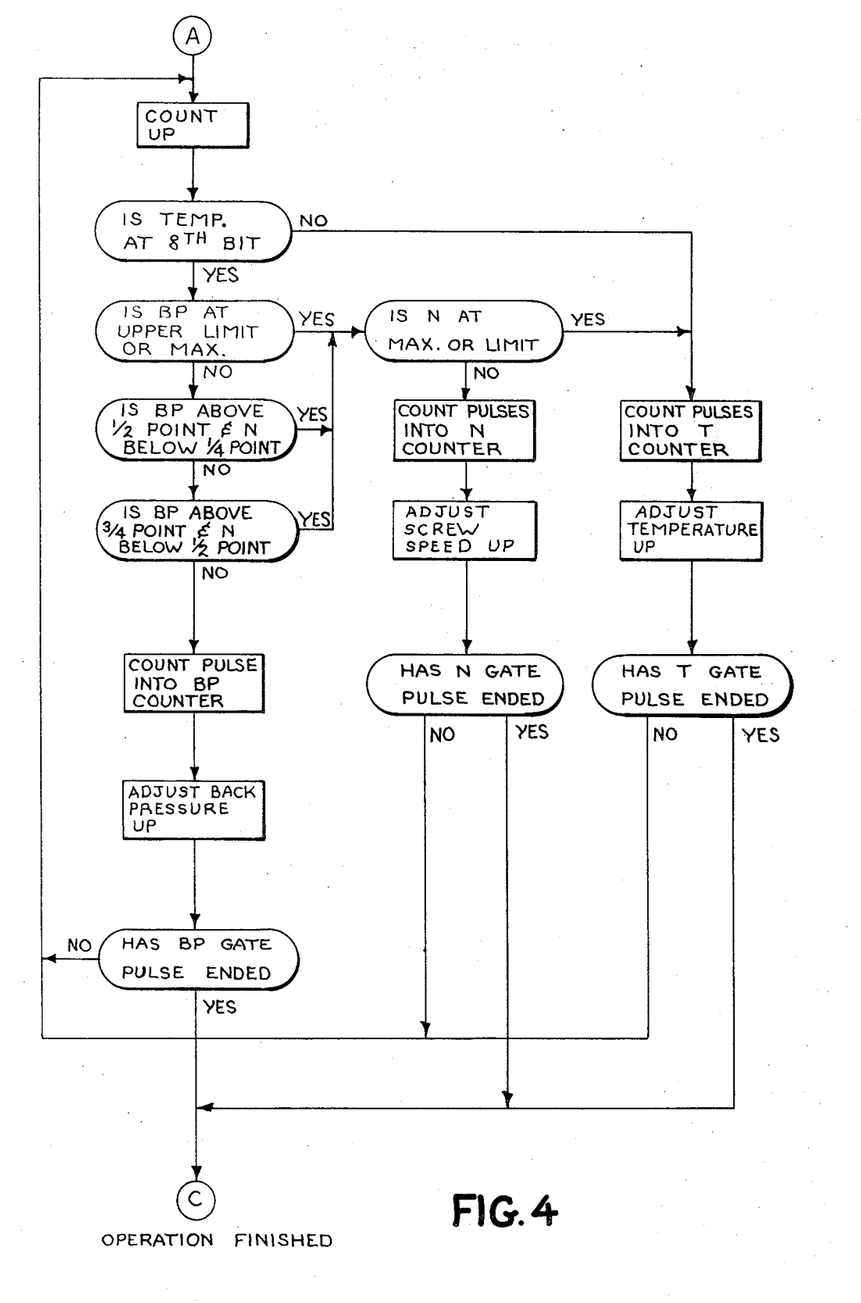
Figure 5:
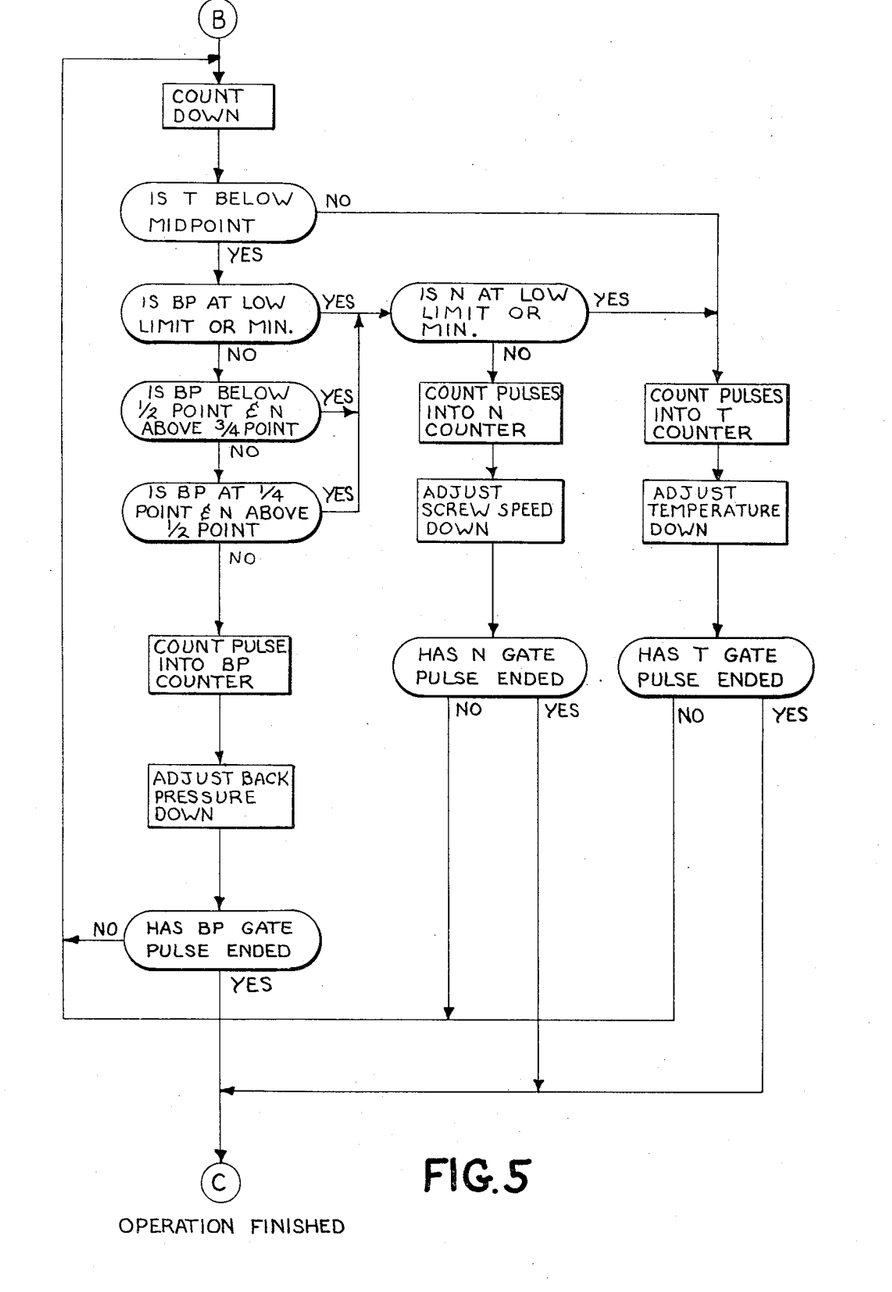

FIGS. 3, 4 and 5 are flow charts for a graphic illustration of the selection of mode control. At the start of the cycle, the sequence control 41 (FIG. 1A) performs functions such as closing the mold and loading the charge into the mold, injecting the plastic, etc. At the proper time, a temperature stabilize check is made. If the melt temperature has stabilized, the following decision to be made is — "Does the melt temperature error exist?" If no error exists, the cycle is completed by returning to the start of cycle in FIG. 3. If the melt temperature has not stabilized, the new temperature is introduced into the analog read and hold circuit 53 in FIG. 1A and the cycle completed thereby. If, however, a melt temperature error exists, the next decision to be made is whether the error is positive or negative. If the error is negative, then the steps shown in FIG. 4 are followed through circle A. If, however, the error is positive, the steps in FIG. 5 are followed through circle B. Assume now that an increase in temperature is required. A negative error signal is resultant, directing flow into circle A. Referring now to FIG. 4, circle A, leads to the countup action necessary to increase the temperature to a required level. The first decision to be made is based on the question — "Is the temperature at the midpoint?" The term "midpoint" refers to half of the maximum content of the counter. If the answer to this question is "yes", the next question and decision to be made is — "Is the back pressure at its upper limit?"; i.e., is the counter at maximum value or full or at the value set into the counter by the maximum and minimum adjust circuit 157 in FIG. 1C. If the answer to this question is "no", the next question asked is — "Is the back pressure above the midpoint and the screw speed below the quarter point?" If the answer to this is "no", there is yet one more question — "Is the back pressure above three quarters and the screw speed below half point?" If the answer this time is "no", the action taken is to count pulses into the back pressure counter. This action results in the adjustment of the back pressure in the up direction by the appropriate control. The final question now is — "Has the back pressure gate pulse ended?" This is the result of the back pressure gate timing circuit 47, FIG. 1A. If the answer to this question is "yes", the operation of selecting the media for correcting the melt temperature is complete and the operation is now referred to circle C, FIG. 3. If, however, the back pressure gate pulse had not ended, the cycle would have started over at circle A. Assume now that the answer to the first question (Is the temperature at midpoint?) is "no". In this case the temperature counter is energized to count pulses, resulting in an adjustment of the temperature control in the upward direction. The question asked now — "Has the temperature gate pulse ended?" If the answer is "no", the recycling of this particular portion of the functions is performed starting at circle A. If the answer is "yes", the operation is finished, resulting in the updating of the analog read and hold circuit (FIG. 1A) and the completion of the cycle of the machine. If the answer to the question — "Is the back pressure at upper limit or maximum?" — is "yes", responsibility of correction of the melt temperature will be shifted to the screw speed function. The question now asked is — "Is the screw speed at maximum or upper limit?" If the answer is "yes", responsibility of correction of melt temperature will be transferred to the temperature counter. If the answer to the question is "no", the screw speed counter 83 (FIG. 1B) will count pulses during the screw speed gate timing pulse. The next question asked is — "Has the screw speed gate pulse ended?" If the answer is "no", recycling to circle A results. if the answer is "yes", operation of the selection of control function is complete resulting in diverting the program to circle C in FIG. 3, and thereby completing the cycle and updating the new temperature data into the analog read and hold circuit 53 in FIG. 1A and the completion of the cycle by injecting the plastic into the mold.

Assume that the melt temperature is too high, causing the error signal to be positive (FIG. 3). This condition results in the decisions being routed through circle B in FIG. 5. Under this condition, the first question to be answered is — "Is the temperature below the midpoint?" If the answer is "yes", the next question is — "Is back pressure at a low limit or at the minimum set by the max and min adjustment circuit 157 (FIG. 1C)?" If the answer is "no", the next question is — "Is back pressure below the one half point and is screw speed above the three quarter point?" If the answer is "no", the next question is — "Is back pressure at one quarter point and screw speed (N) above the one half point?" If this time the answer is "no", the counter will be caused to count back thereby causing the back pressure control 89 to adjust back pressure downward.

If in the beginning of the program, the answer to the question "Is temperature below midpoint?" had been "no", then the temperature counter would have had to reduce its contents so that the heater control 15 would make the correction.

If the answer is "yes" to any of the three following questions:
1. Is BP at low limit or minimum?
2. Is BP below one half point and screw speed (N) above three quarter point? and,
3. Is BP at one quarter point and screw speed (N) above one half point?

responsibility for correction of the melt temperature is directed to screw speed counter and associated control.

FIG. 5 similar to FIG. 4 shows clearly the parameters determining the decision which of the control modes, back pressure, screw speed, or heater temperature is responsible for correction of the melt temperature, when such correction is indicated by a difference in the output of the melt temperature potentiometer and the output of the thermocouple 35 in FIGS. 1A and 1B.

With a change in any of the above parameters, the temperature of the plastic melt is changed associated by a change in the viscosity of the melt, and a resultant effect on the physical properties of the final product.

The above described control provides the means for producing molded parts having consistent physical properties by maintaining the temperature of the melt within the limits set by the operator of the injection molding machine.

While there has been shown and described what is at present considered to be the preferred embodiment of the invention, modifications thereto will readily occur to those skilled in the art. It is not desired, therefore, that the invention be limited to the specific arrangement shown and described and it is intended to cover in the appended claims all such modifications as fall within the true spirit and scope of the invention.

What is claimed is:

1. A control for the temperature of plastic melt within an injection molding machine having a barrel, heating means for heating said barrel, a screw within said barrel, motor means for rotating the screw and means for applying pressure to said screw in a direction along its longitudinal axis whereby said screw acts as a piston comprising:
   a. a first control means connected to said heating means for controlling the amount of heat supplied to said barrel by said heating means;
   b. a second control means connected to said motor means for varying the rotational speed of said screw;
   c. a third control means connected to said means for applying pressure to said screw for varying the amount of pressure applied to said screw; and,
   d. means interconnecting said first, second and third control means for rendering said control means selectively operable whereby the temperature of the plastic melt is maintained within predetermined limits.

2. The invention in accordance with claim 1 wherein said means interconnecting said first, second and third control means includes selection logic circuitry for rendering each of said controls operative in a predetermined order.

3. The invention in accordance with claim 1 wherein there is further included pulse generating means to generate a train of pulses and in which each of said control means includes a reversible counter selectively responsive to said train of pulses to generate a count indicative of the magnitude of adjustment to be effected by the control.

4. The invention in accordance with claim 3 in which said pulse generating means is responsive to the temperature of the plastic melt within said barrel.

5. The invention in accordance with claim 4 in which the pulse generating means is operable to produce pulse trains of different frequencies in accordance with the amount of temperature difference between the melt and a predetermined reference.

6. The invention in accordance with claim 3 wherein said means interconnecting said first, second and third control means includes selection logic circuitry responsive to the counts in each of said counters for selectively rendering each of said controls operative in a predetermined order.

7. The invention in accordance with claim 6 wherein said selection logic circuitry determines the direction of count in said counters.

8. A melt temperature control for use with an injection molding machine having a barrel heated by a plurality of heating elements, a screw adapted for rotary and reciprocal motions disposed within the barrel, a motor for rotating the screw and means for applying pressure to the screw in a longitudinal direction, comprising:
   a. a source of power;
   b. a first control means connected to the heating elements and said source of power for varying the quantity of power applied to the heating elements;
   c. a pulse generating means for producing pulses at varying frequencies;
   d. a first reversing counter connected to said frequency generating means for selectively counting said pulses;
   e. means connected to said first control means and said counter for generating a signal proportional to the content of said first counter and applying said signal to said first control means for regulating the quantity of power applied to the heating elements;
   f. a second control means connected to the motor and said source of power for varying the quantity of power applied to the motor;
   g. a second reversing counter connected to said pulse generating means for selectively counting said pulses;
   h. means connected to said second control means and said second counter for generating a signal proportional to the content of said counter and applying said signal to said second control means for regulating the quantity of power applied to the motor to vary the speed of said motor;
   i. a third control means connected to the means for applying pressure and said source of power for varying the quantity of power applied to the pressure applying means;
   j. a third reversing counter connected to said pulse generating means for selectively counting said pulses;
   k. means connected to said third control means and said third counter for generating a signal proportional to the content of said third counter and applying said signal to said third control means for regulating the quantity of power applied to the means for applying pressure to thereby vary the pressure applied to said screw;
   l. means connected to said first, second and third counters and said pulse generating means for selectively directing one of said counters to count said pulses; and,
   m. means for steering the direction of count of said counters.

9. The invention in accordance with claim 8 in which the pulse generating means is responsive to the melt temperature.

10. The invention in accordance with claim 9 in which the pulse generating the frequency of pulses is dependent upon the difference between the melt temperature and a predetermined reference temperature.

11. The invention in accordance with claim 8 in which said first, second and third control means are rendered selectively operative by selection logic circuitry responsive to the content of each of said counters.

* * * * *

Disclaimer 3,728,058.—*James E. Wheeler,* Roanoke, Va. PLASTIC MELT TEMPERATURE CONTROL. Patent dated Apr. 17, 1973. Disclaimer filed Feb. 26, 1981, by the inventor, the assignee, *General Electric Co.,* consenting Hereby enters this disclaimer to claim 1 of said patent.

[*Official Gazette May 19, 1981.*]